United States Patent [19]

Kelley

[11] Patent Number: 4,569,446

[45] Date of Patent: Feb. 11, 1986

[54] METHOD AND APPARATUS FOR FEEDING A PRODUCT INCLUDING FINES

[75] Inventor: John L. Kelley, Houston, Tex.

[73] Assignee: Kelley-Perry, Incorporated, Houston, Tex.

[21] Appl. No.: 437,860

[22] Filed: Oct. 29, 1982

[51] Int. Cl.[4] ................. B07B 13/05; G01G 13/08
[52] U.S. Cl. ........................... 209/660; 209/674; 209/682; 209/920; 177/123; 222/56; 222/77
[58] Field of Search .............. 209/660, 674, 920, 677, 209/682; 222/14, 16, 52, 56, 57, 63, 77, 161; 177/1, 122, 123, 119

[56] References Cited

U.S. PATENT DOCUMENTS

| 3,253,699 | 5/1966 | Schneider | 209/674 X |
| 3,291,233 | 12/1966 | Mayer | 177/122 X |
| 3,506,118 | 4/1970 | Illuzzi | 209/674 X |
| 3,540,538 | 11/1970 | Connors | 177/122 |
| 3,784,007 | 1/1974 | Skrmetta | 209/674 |
| 4,010,809 | 3/1977 | Hobart | 177/123 X |

FOREIGN PATENT DOCUMENTS

| 658789 | 3/1963 | Canada | 177/119 |
| 1441632 | 4/1965 | France | 209/682 |
| 0123813 | 9/1980 | Japan | 209/920 |

Primary Examiner—Joseph J. Rolla
Assistant Examiner—Kevin P. Shaver
Attorney, Agent, or Firm—A. W. Breiner

[57] ABSTRACT

This relates to a method of and an apparatus for feeding a product which includes fines to a weigh hopper. In lieu of the usual feeder pan, the last feeder pan in the feeder system is a duplex feeder pan including an upper feeding pan or level and a lower feeding pan or level. The upper feeder pan is provided with selected apertures therein so that fines will be separated from the remainder of the product and directed into the lower feeder pan. During the normal filling of the weigh hopper, both the upper feeder pan and the lower feeder pan will discharge into the weigh hopper. When a preselected underweight condition occurs, at least a part of the product from the upper pan will be diverted from immediately entering into the weigh hopper, while the feeding of the fines will continue so as to bring the weight of the product within the weigh hopper up to the pre-selected weight with a minimum of overweight.

9 Claims, 7 Drawing Figures

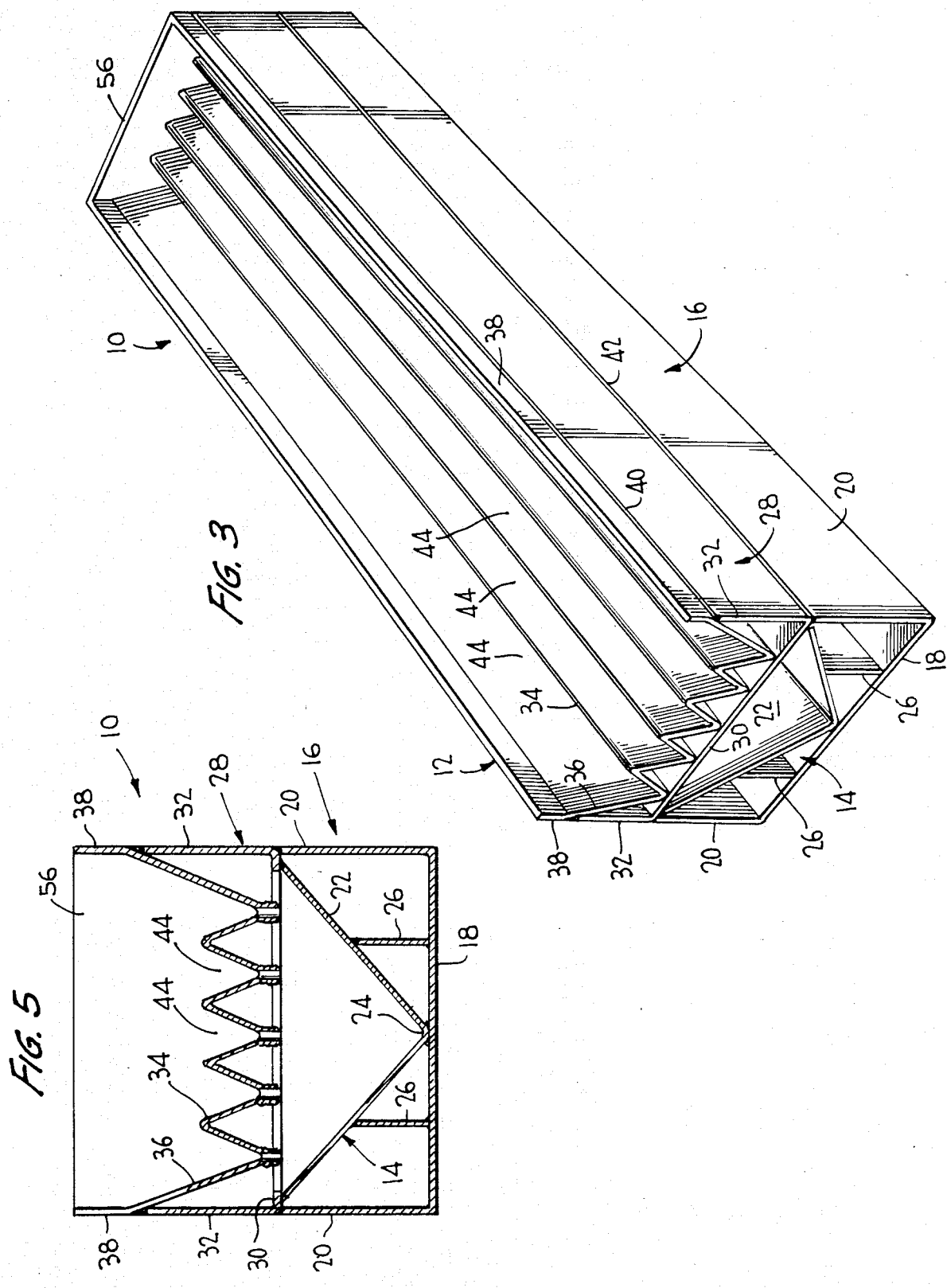

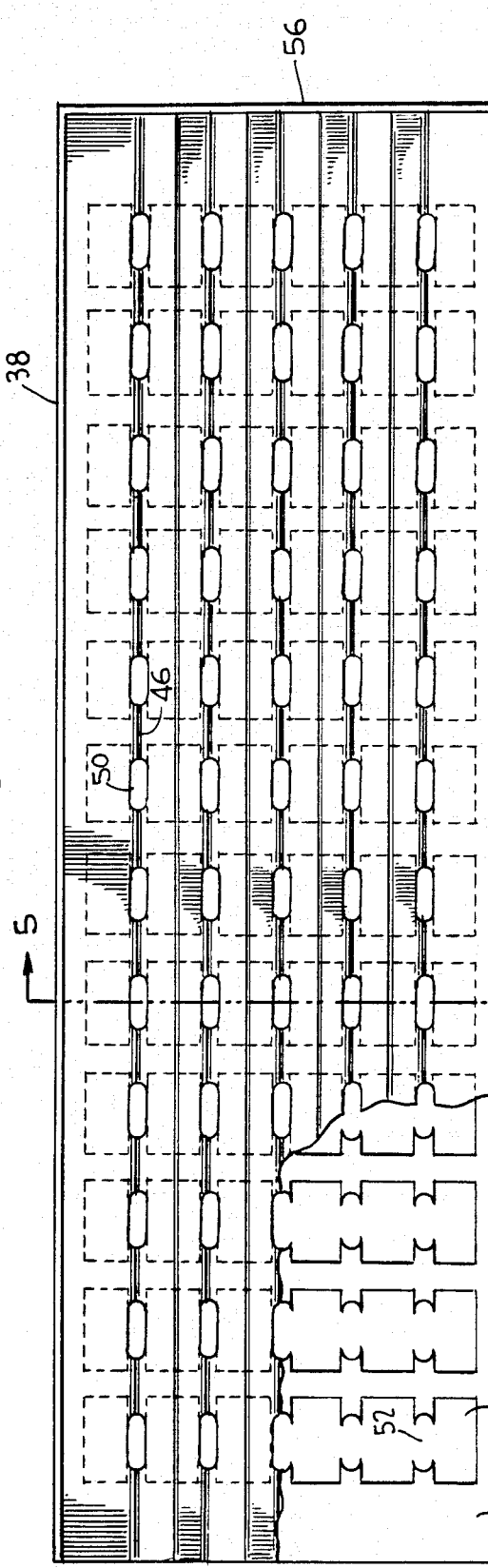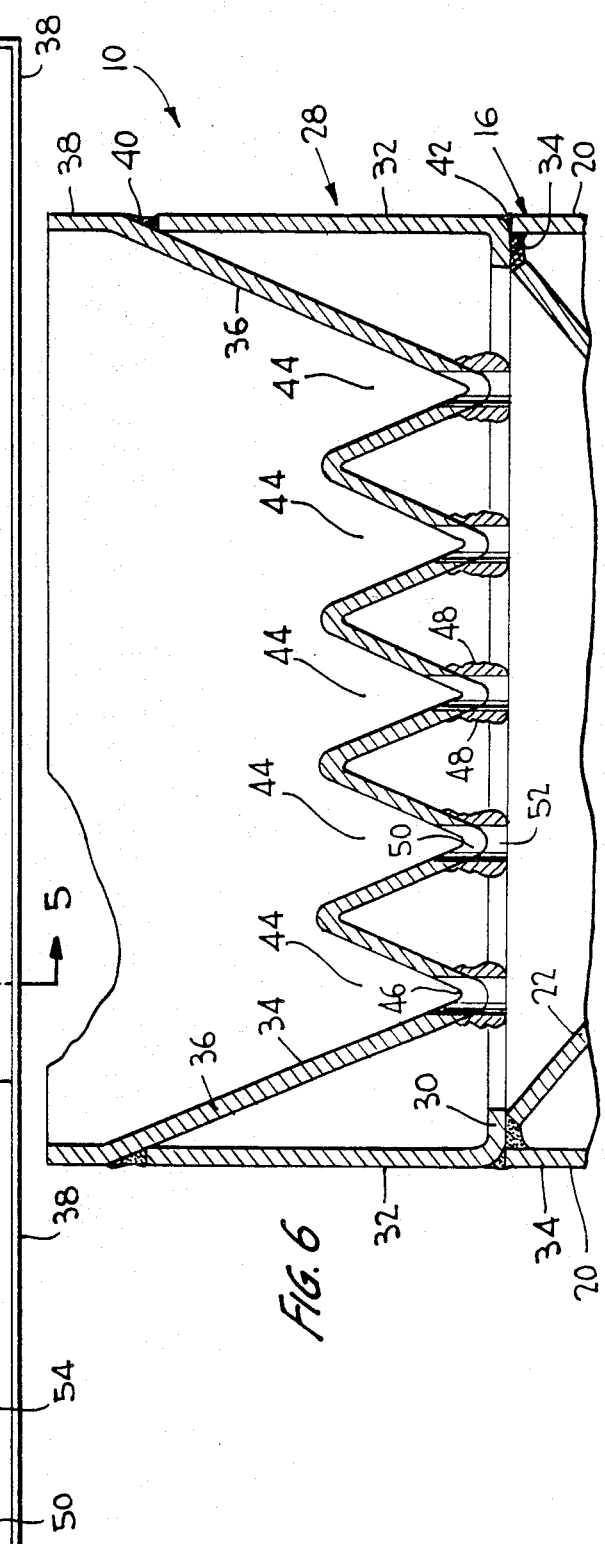

METHOD AND APPARATUS FOR FEEDING A PRODUCT INCLUDING FINES

This invention relates in general to new and useful improvements in feed mechanisms for products which are to be controllably fed to a weigh hopper for the packaging of predetermined weights of such products. This invention in particular relates to a product, such as potato chips and the like, which naturally include large pieces, small pieces, and fines. The products may also include cookies, candies, edible nuts, pretzels, and various other dry and semi-dry free-flowing products.

Products such as potato chips and the like are customarily fed to a weigh hopper for the gathering of a predetermined weight of the product, after which the weighed product is transferred to a suitable package-forming member such as bags, cans, jars, boxes, cartons, and the like. Good weighing methods and apparatus have been a challenge to the industry for many years. The difficulty has always been the accurate feeding of a pre-selected weight of the product, while generally maintaining a consistency of the product and product quality.

In accordance with this invention, in lieu of feeding final weigh hopper from a single final feeder pan, the final feeder pan is a duplex or two-story feeder pan including a first or upper feeder pan and a second or lower feeder pan. The feeder pans are interconnected for simultaneous vibration.

In accordance with this invention, the upper feeder pan is of a construction wherein at least certain of the fines are transferred from the upper feeder pan to the lower feeder pan so that the upper feeder pan directs into the weigh hopper primarily large and small pieces of the product and substantially no fines, and the lower feeder pan directs substantially only fines into the weigh hopper.

In accordance with this invention, the upper feeder pan is provided with a suitable gate which will prevent all or a selected amount of the flow of the product from the upper feeder pan into the weigh hopper, while the lower feeder pan will constantly feed fines into the weigh hopper. A conventional control mechanism functions when a pre-selected underweight occurs to actuate the gate of the upper feeder pan while the lower feeder pan continues to direct fines into the weigh hopper so as to complete the weight requirement. In this manner the final feed is relatively slow and may be very accurate.

In accordance with this invention, there may be other variations including means for reducing the amplitude of the duplex feeder pan after the prescribed underweight occurs; the gate for the upper feeder pan may not completely close off the upper feeder pan so that small pieces of the product may continue to flow into the weigh hopper; or there may be positioned between the upper feeder pan discharge and the weigh hopper an intermediate hopper which will move into an intervening position once the prescribed underweight condition occurs so as to not require discontinuation of the feeding of the product by the upper feeder pan, and wherein as soon as the product weight is obtained and the weighed product is discharged into a bag, or other type container, the intermediate hopper will be emptied thereby speeding up the filling operation.

Having described the invention in general terms, specific and presently preferred embodiments will be set forth in the context of the illustrative drawing.

FIG. 3 is a perspective view of the duplex feeder which is the subject of this invention and shows the general details thereof.

FIG. 4 is an enlarged plan view of the duplex feeder of FIG. 3 and shows further the details thereof.

FIG. 5 is an enlarged transverse sectional view taken generally along the line 5—5 of FIG. 4 and shows the specifics of the duplex feeder.

FIG. 6 is a further sectional view similar to FIG. 5 but on a larger scale and with only the upper part of the duplex feeder being illustrated.

Figure 1:
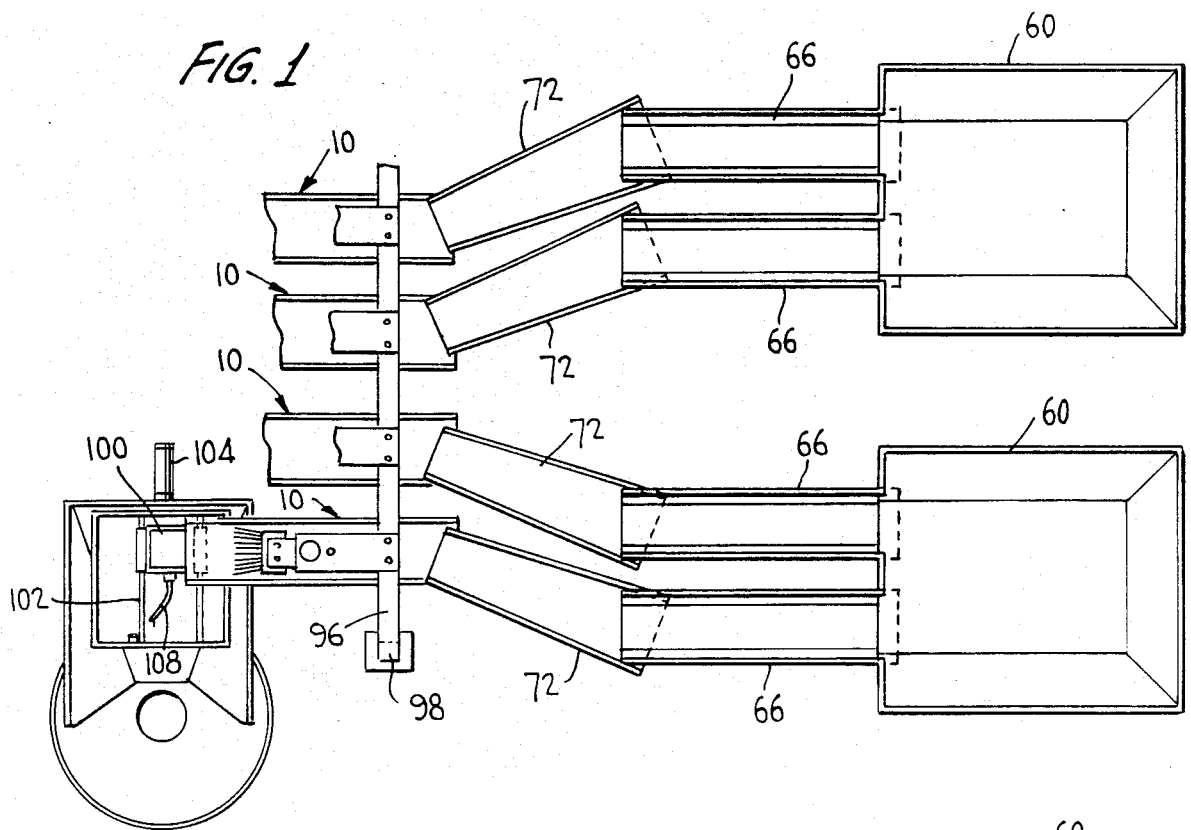
FIG. 1 is a plan view of the conventional type of automatic weighing system having incorporated therein as the final feeder a duplex feeder pan in accordance with this invention.

Reference is made to FIGS. 3–6 wherein there is illustrated the specific details of the duplex feeder which is the subject of this invention. The duplex feeder is generally identified by the numeral 10 and includes an upper feeder pan 12 and a lower feeder pan 14. As will be apparent from the following description of the duplex feeder 10, the upper feeder pan 12 receives the product to be weighed, packaged, and during the flow of the product along the upper feeder pan 12, fines are removed from the product and delivered into the lower feeder pan 14 for separate discharge.

Referring now to FIGS. 5 and 6 in particular, it will be seen that the duplex feeder 10 includes a channel member 16 which has a base 18 and a pair of upstanding sidewalls 20. The lower feeder pan 14 is primarily in the form of a V-shaped cross-sectional pan member 22 which has a lower-most apex 24 seated on and suitably secured to the base 18. The feeder pan 22 is braced by a pair of longitudinally extending strips or braces 26 which extend upwardly from the base 18 on opposite sides of the apex 24.

A second channel member 28 is seated on upper edges of the sides 20 and includes a base plate 30 and upstanding sides 32. The upper edges of the lower feeder tray 22 are secured to the underside of the base plate 20 by welding, as in 34 in FIG. 6.

The channel 28 has positioned therein an upper feeder pan 12 which is seated on the base plate 30 and which has sidewalls 36 sloping up with a diverging relation and terminating in upper parallel wall portions 38. It will be seen that the upper feeder pan 12 is welded to the sidewalls 32 of the channel 28 as at 40, while the channel 28 is secured to the channel 16 by welding as at 42.

The upper feeder pan 12 has a base portion which is of a generally corrugated construction so as to define a plurality of shallow, narrow troughs 44. Each trough 44 has a lower apex 46 which seats on the base plate 30 and which is secured to the base plate 30 by welding as at 48.

As will be apparent from FIG. 4, the apices 46 of the troughs 44 are provided at longitudinally spaced intervals with longitudinal openings 50. In a like manner, the base plate 30 is provided with similar openings 52 which are aligned with the openings 50 so as to communicate the lower parts of the troughs 44 with the underlying lower feeder tray at longitudinally spaced intervals. The openings 50, 52 may be increased or decreased in size, either longer or wider, depending on the product type and the amount of product to be weighed per weighment.

It is further to be noted with respect to the lower left corner of FIG. 4 that the base plate 30 is provided on the opposite side of each of the openings 52 and longitudinally beyond each opening 52 with a generally rectangular opening 54. The purpose of each opening 54 is to permit access to the underside of the troughs 44 so that the welds 48 may be formed.

The duplex tray 10 further includes an end wall 56 at its upper end with the discharge end thereof being open.

Figure 2:
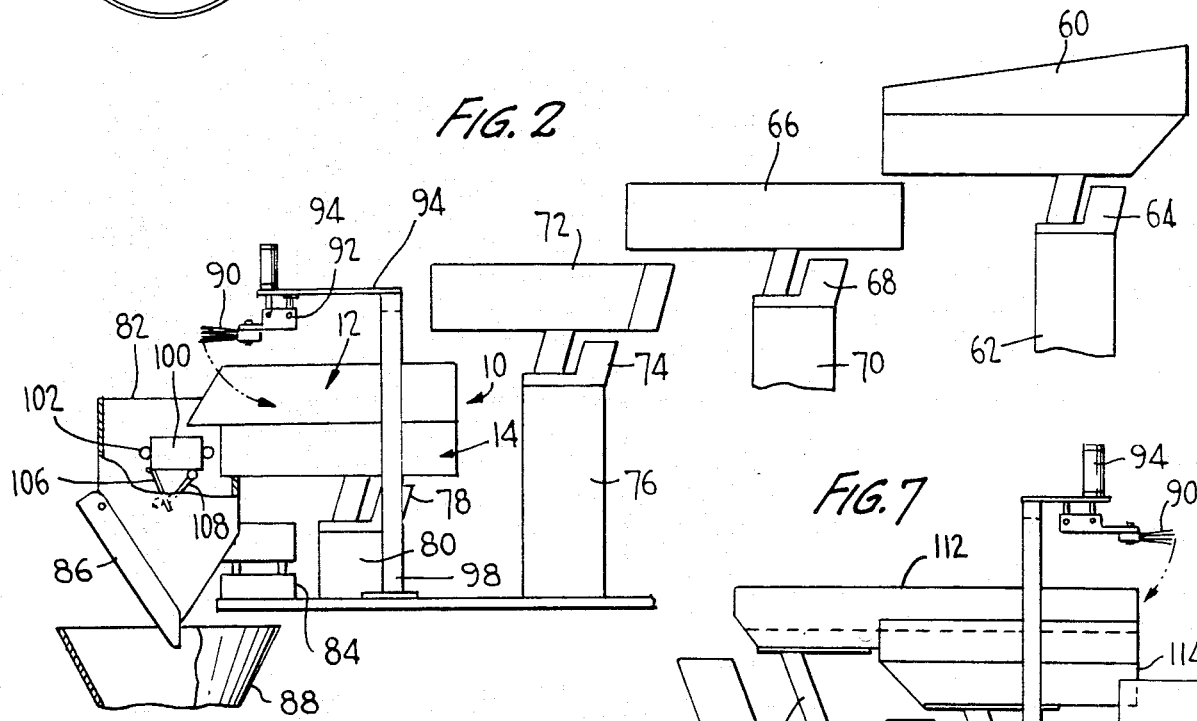
FIG. 2 is a side elevational view of the automatic weighing system of FIG. 1 and shows further details thereof.

Referring now to FIGS. 1 and 2, it will be seen that there is illustrated the weighing system in which the duplex pan feeders are incorporated. As is customary, the weighing system may include a plurality of supply hoppers 60 which are supported by a support 62, and wherein each supply hopper 60 is particularly mounted on a controllable vibrator 64 in a customary manner. In the illustrated weighing system, each supply hopper 60 feeds a pair of first feeder pans 66 which are carried by individual vibrators 68 mounted on supports 70. Each feeder pan 66 feeds an intermediate feeder pan 72 (there may be more than one feeder pan 72 in series). Each feeder pan 72 is carried by a vibrator 74 which is mounted on a suitable support 76. The intermediate feeder pans 72 feed final feeder pans which, in accordance with this invention, are the duplex feeder pans 10. Each feeder pan 10 is carried by a controllable vibrator 78 which is carried by a suitable support 80.

In accordance with this invention, each duplex feeder pan 10 is positioned to direct a product being fed into a weigh hopper 82 which is conventional and which is provided with scales 84. Each weigh hopper 82 is provided with a pivotally mounted botton 86 which, when opened, empties the product accumulated in the weigh hopper 82 into a funnel or like member 88 for directing the product into a bag.

In accordance with this invention, the uniformly divided product is directed by a respective intermediate feeder pan 72 into the upper feeder pan 12 of the duplex feeder pan 10. As the product flows along the upper feeder pan 12, fines and small pieces of the product fall into the troughs 44 while the larger pieces ride on the upper edges of the troughs. Further, the vibratory action of the vibrator 78 serves to separate the fines from the small pieces, with the fines passing through the aligned openings 50, 52 from the upper feeder pan 12 down into the lower feeder pan 14.

Further in accordance with this invention, a product is directed into the weigh hopper 82 from both the upper feeder pan 12 and the lower feeder pan 14 until such time as the scales 84 indicate that the weight of the product within the weigh hopper 82 has reached a pre-selected underweight. At this time the flow from the upper feeder pan 12 into the weigh hopper 82 is interrupted, while flow of the fines from the lower feeder pan 14 is continued until the pre-selected weight is obtained in the weigh hopper 82. At this time the bottom 86 of the weigh hopper opens in the customary manner and the accumulated product is immediately discharged into the funnel 88, after which the bottom 86 returns to its closed position and the weigh hopper 82 is ready to receive the next supply of the product to be packaged.

In order to implement the use of the invention as described above, the weighing system may include other features. For example, the vibrator 78 may be of variable amplitude and, once the pre-selected underweight condition exists, the amplitude of the vibrator 78 may be reduced so as to provide a slower flow of the fines.

With respect to interrupting the flow from the upper feeder pan, several solutions may be provided. For example, each upper feeder pan 12 may have associated therewith a gate 90 in the form of a brush. The gate 90 is pivotally mounted as at 92, and is swung to a product-retaining position by means of a controller 94 which may be in the form of an air cylinder, a fluid cylinder, a solenoid or the like. Each gate assembly is mounted on a support bracket 94 which projects from a support arm 96 which, in turn, is supported by suitable supports 98, as is clearly shown in FIG. 1.

It is also to be understood that the height of the gate 90 may be varied. For example, the gate 90 may be of a size and position to close only the space in the upper feeder pan 12 above the troughs 44 so that small pieces of the product will be continued to be fed into the weigh hopper 82 after the gate 90 is positioned.

It is also feasible to intercept the product flowing from the upper feeder pan into the weigh hopper 82. For this purpose there would be an intermediate hopper 100 which is mounted on a pair of support rods 102 which extend across the interior of the weigh hopper 82. The position of the intermediate hopper 100 would be controlled by an extensible fluid motor 104 which would either position the intermediate hopper 100 to one side of the duplex feeder pan 10 or in alignment therewith as is shown in FIG. 1. The intermediate hopper 100 would be provided with a swingably mounted bottom 106 which is moved to a closed position when the intermediate hopper 100 is moved towards alignment with the duplex feeder pan 10 by means of a guide member 108. Thus, the bottom 106 would immediately swing to an open position when the intermediate hopper 100 is shifted to its position out of alignment with the duplex feeder pan 10.

With particular reference to FIG. 2, it is to be understood that when the intermediate hopper 100 is utilized, it will be necessary to extend the upper feeder pan 12 beyond the lower feeder pan 14 as shown in FIG. 2. This would merely require an extension of the channel 28 and the pan 34, with the pan 34 being free of the apertures 50 in that portion thereof which extends beyond the pan 22.

It is to be understood that when the intermediate hopper 100 is utilized, it will be shifted to receive the product from the upper feeder pan 12 after the pre-selected underweight condition occurs. However, the product will be fed from the upper feeder pan 12 at the normal rate. As soon as the pre-selectd weight of the product occurs within the weigh hopper 82 and the weighed product is discharged from the weigh hopper 82, the intermediate hopper 100 would immediately move to its out-of-the-way position and discharge the product accumulated therein into the weigh hopper 82. Thus, in effect, there would be no slowdown in the product feeding operation.

Figure 7:
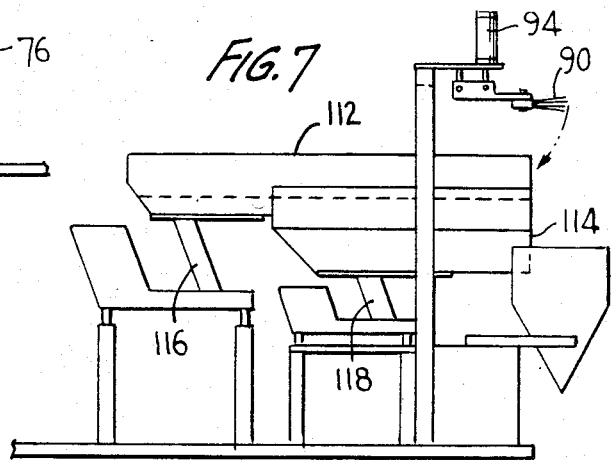
FIG. 7 is a fragmentary side elevational view of the automatic weighing station of a modified arrangement of final feeders.

In FIG. 7 there is illustrated a modified arrangement wherein the upper feeder pan 112 is mounted separate and apart from the lower feeder pan 114 on separate vibratory supports 116 and 118, respectively. As in the case of the upper feeder pan 12, there will be provided the gate 90 actuated by the solenoid 94.

By having the feeder pans 112 and 114 separately mounted, when there are instances where there are not enough fines to make up the target weight, the upper feeder pan 112 may be separately actuated while holding the lower feeder pan 114 stationary for accumulating therein the fines. Then, when the target weight is approached and the gate 90 closes, the lower feeder pan may be actuated to feed the necessary accumulated fines to make up the target weight. For example, if the target weight is 3 ounces, the product is fed by way of only the upper feeder pan 112 until the accumulated weight is $2\frac{3}{4}$ ounces, at which time the gate 90 closes and the lower feeder pan is actuated to feed the remaining $\frac{1}{4}$ ounce requirement.

It is to be understood that there is always the possibility that there would not be sufficient fines in the lower feeder pan to provide the necessary material to bring the product weight up to the prescribed weight. In such an event, it would be necessary to momentarily open the gate 90 by way of a time control circuit. It is preferred not to utilize such a system because it is very difficult to prevent an overweight.

Although only preferred embodiments of the invention have been specifically illustrated and described herein, it is to be understood that further modifications of the invention may be incorporated without departing from the spirit or scope of the invention as defined by the appended claims.

It is claimed:

1. A method of feeding a product of the type including large pieces and fines to a weigh hopper, said method comprising the steps of flowing the product toward a weigh hopper in a first feeder pan and an underlying second feeder pan while removing fines from the product directly into the second feeder pan, stop feeding the product larger pieces from the first feeder pan into the weigh hopper when a preselected underweight occurs while continuing to feed the fines into the weigh hopper until a pre-selected weight is obtained, said product flow from the first feeder pan into the weigh hopper being controlled by a gate which closes discharge of the product to the weigh hopper only with respect to large product pieces while permitting smaller product pieces to pass under the gate.

2. A method according to claim 1 wherein the first and second feeder pans are separately mounted for independent vibration.

3. A method according to claim 1 wherein the first and second feeder pans are in generally aligned interconnected relation to each other, and the feeder pans are vibrated in unison.

4. A method according to claim 3 wherein the amplitude of pan vibration is reduced when the pre-selected underweight occurs.

5. A product feeding apparatus comprising a first feeder pan and a second feeder pan, means mounting said feeder pans functioning together as a unit with said first feeder pan being axially aligned with said second feeder pan and overlying said second feeder pan, said first feeder pan having a bottom structure including means for directing fines through said bottom structure into said underlying second feeder pan, a weigh hopper for receiving a product and fines from said feeder pans, and means for restricting flow from said upper feeder pan into said weigh hopper while permitting continued flow of fines from said lower feeder pan into said weigh hopper whereby when a pre-selected underweight condition occurs product flow from said upper feeder pan into said weigh hopper is controlled by a gate which prevents flow of only larger product pieces while permitting flow of small product pieces.

6. An apparatus according to claim 5 wherein a variable amplitude vibrator is connected to said feeder pans for vibrating said feeder pans in unison, and there are means for reducing said vibrator amplitude when the pre-selected underweight condition occurs.

7. Apparatus according to claim 5 wherein the first and second feeder pans are separately mounted for independent vibration.

8. An apparatus according to claim 5 wherein said bottom structure includes a plurality of narrow and shallow longitudinally extending troughs for receiving small product pieces and fines, and said means for directing fines includes longitudinally spaced openings in said bottom structure at the bottom of said troughs.

9. An apparatus according to claim 8 wherein said bottom structure includes a base plate underlying said troughs, said base plate having flow openings therethrough aligned with said longitudinally spaced openings, and said base plate further having access openings therethrough on the opposite side of each flow opening to facilitate welding of said troughs to said base plate.

* * * * *